United States Patent
Andersen

(10) Patent No.: US 7,563,295 B2
(45) Date of Patent: Jul. 21, 2009

(54) FILTER HAVING INLET PORTION WITH DIFFUSER ELEMENTS

(75) Inventor: Christian Andersen, Høng (DK)

(73) Assignee: Simatek A/S, Jerslev Sjaelland (DK)

( * ) Notice: Subject to any disclaimer, the term of this patent is extended or adjusted under 35 U.S.C. 154(b) by 294 days.

(21) Appl. No.: 10/545,167

(22) PCT Filed: Feb. 5, 2004

(86) PCT No.: PCT/DK2004/000085
§ 371 (c)(1),
(2), (4) Date: Oct. 31, 2005

(87) PCT Pub. No.: WO2004/071622
PCT Pub. Date: Aug. 26, 2004

(65) Prior Publication Data
US 2006/0112666 A1     Jun. 1, 2006

(30) Foreign Application Priority Data
Feb. 12, 2003    (DK) ............................. 2003 00214

(51) Int. Cl.
*B01D 46/00* (2006.01)
(52) U.S. Cl. .................... 55/302; 55/283; 55/294; 55/341.1; 55/484; 95/279; 95/280; 95/286
(58) Field of Classification Search .................. 55/294, 55/302, 341.1, 484, 283; 95/279, 280, 286
See application file for complete search history.

(56) References Cited
U.S. PATENT DOCUMENTS 3,395,518 A * 8/1968 Krane .......................... 55/290
3,726,066 A * 4/1973 Colley et al. ................. 55/302
3,831,354 A   8/1974 Bakke
4,384,874 A * 5/1983 Dattilo ......................... 96/426

(Continued)

FOREIGN PATENT DOCUMENTS

DE       3805718       9/1989

(Continued)

OTHER PUBLICATIONS

WPI/Derwent Abstract of RU2015404 of Jun. 30, 1994.

(Continued)

*Primary Examiner*—Jason M Greene
*Assistant Examiner*—Minh-Chau T Pham
(74) *Attorney, Agent, or Firm*—Dykema Gossett PLLC

(57) ABSTRACT

A filter including a filter housing with an essentially horizontal partition wall that divides the filter housing into a clean-air chamber and a dust chamber. The partition wall is provided with a number of apertures in which a number of filter bags are provided that are secured to the partition wall and extend down into the dust chamber. The filter is provided with an inlet portion in open communication with the dust chamber in a level that is above a lowermost end of the filter bags, wherein the inlet portion is configured for introducing a dust-containing flow of air into the dust chamber, from there it can be sucked through the filter bags and up into the clean-air chamber, from where the filtered air is discharged through a clean air outlet. A number of diffuser elements are arranged in the inlet portion outside the filter housing.

8 Claims, 1 Drawing Sheet

U.S. PATENT DOCUMENTS

| | | | |
|---|---|---|---|
| 4,655,804 A | 4/1987 | Kercheval et al. | |
| 4,836,834 A * | 6/1989 | Steele | 95/279 |
| 5,030,261 A | 7/1991 | Giusti | |
| 5,069,691 A | 12/1991 | Travis et al. | |
| 5,846,300 A | 12/1998 | Johnson | |
| 6,786,946 B2 * | 9/2004 | Jung | 55/302 |
| 7,182,799 B2 * | 2/2007 | Dries | 55/341.1 |
| 2003/0041729 A1 * | 3/2003 | Finigan | 95/26 |

FOREIGN PATENT DOCUMENTS

| | | |
|---|---|---|
| WO | 01/03808 | 1/2001 |

OTHER PUBLICATIONS

WPI/Derwent Abstract of SU1397065 of Jun. 15, 1988.
WPI/Derwent Abstract of JP10216440A of Aug. 18, 1998.
English Abstract of DE 3805718.

* cited by examiner

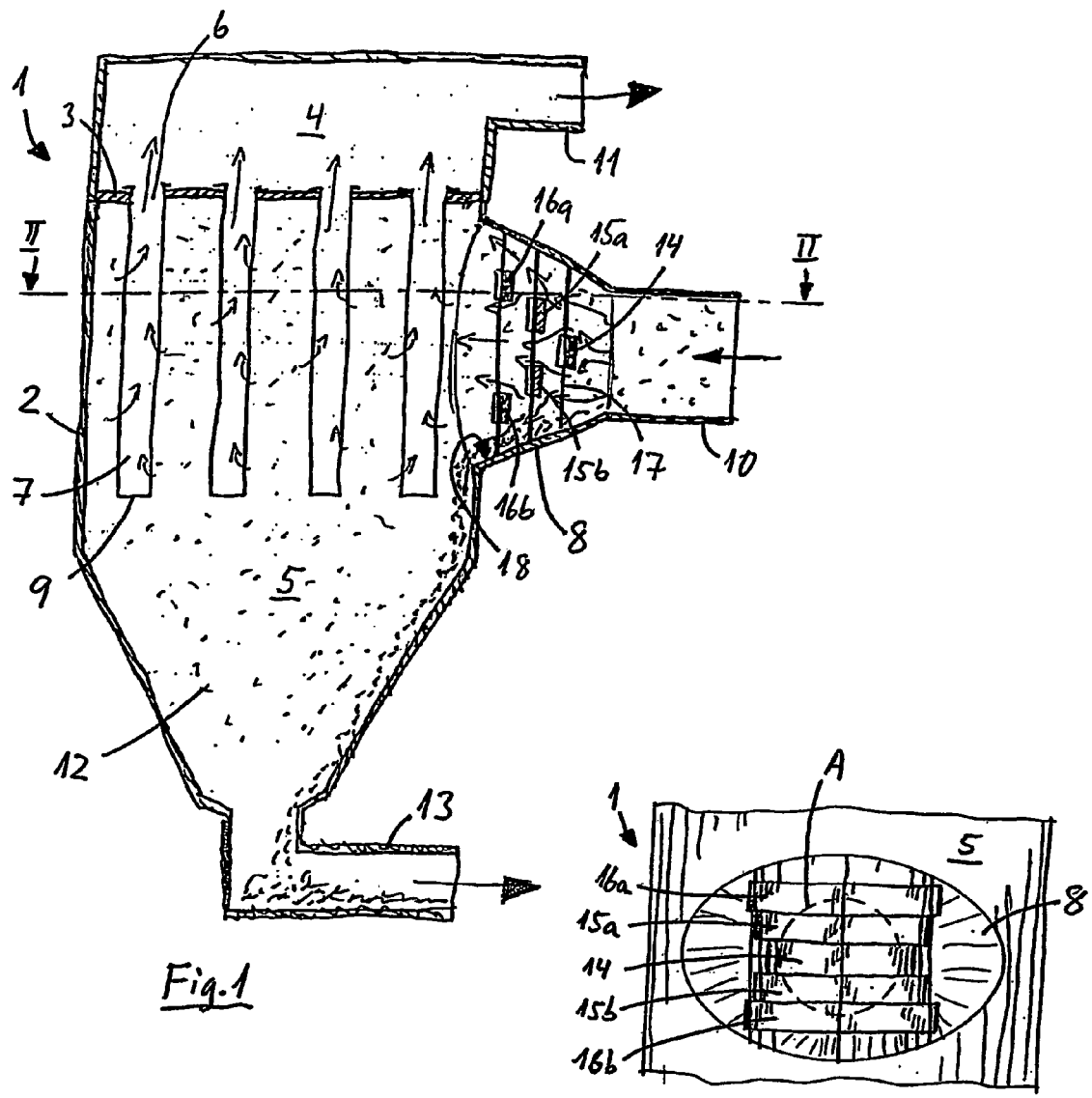
Fig. 1
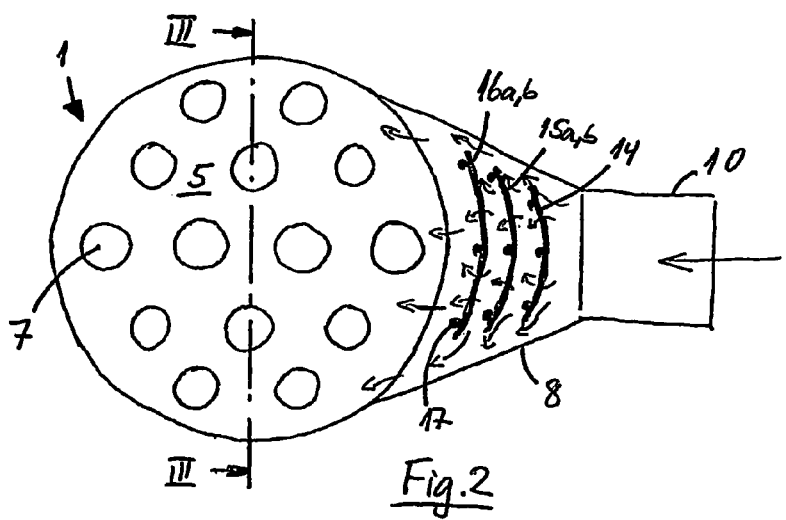
Fig. 2
Fig. 3

FILTER HAVING INLET PORTION WITH DIFFUSER ELEMENTS

BACKGROUND OF THE INVENTION

1. Field of the Invention

The invention relates to a filter comprising a filter housing with an essentially horizontal partition wall that divides the filter housing into a clean-air chamber and a dust chamber, said partition wall being provided with a number of openings in which a number of filter bags are arranged that are secured to the partition wall and extend down into the dust chamber; said filter being provided with an inlet portion in open communication with the dust chamber in a level that is above a lowermost end of the filter bags, wherein the inlet portion is configured for introducing a dust-containing flow of air to the dust chamber, from where it can be sucked up through the filter bags into the clean-air chamber, from where the filtered air is discharged through a clean-air outlet.

2. The Prior Art

Such filters are commonly known (see eg WO 01/03808). Each of the filter bags typically comprises a wire frame on which a bag of a filter material is mounted. These filter bags are suspended from a horizontal partition wall down into a dust chamber, whereto the dust containing air is supplied and sucked upwards above the partition wall through the filter bags. Thereby the dust particles are deposited on the filter bags and drop down to the bottom of the filter housing from where they can be removed.

The present invention relates to the type of filters where the dust containing air is supplied at a level that is level with the filter bags, ie at a level that is above the lowermost end of the filter bags. Filter types are known, where the air is supplied underneath the filter bags, but the present invention is not relevant in connection with these filter types.

When the dust-containing air is supplied to the dust chamber in level with the filter bags, a certain wear occurs on the filter bags, in particular those filter bags that are arranged most proximate the inlet. Usually this wear is limited by requirements being made that a comparatively long rectilinear pipe be used that is connected to a tangential inlet for the dust chamber, whereby the flow of air achieves an optimal velocity profile within the supply pipe before it is deflected and partially braked by the inlet that is usually shaped to be 90°-180° helical. However, in many cases the requirement to use a long, rectilinear supply pipe is overridden by space or cost considerations, which means that the dust-containing flow of air is very turbulent when it enters the helical inlet. This means that the flow of air is unable to follow the helical inlet in an optimal manner, and it will quickly spread into the dust chamber and immediately affect in particular those filter bags that are situated close to the inlet. In particular in that area the filter bags will therefore comparatively quickly be worn by the air's dust particles with an ensuing reduction of filtration rating and requirements to filter bag exchanges.

Moreover, erroneous piping before the filter may cause increased wear on the filter bags due to the dust particles in the air also causing the filter bags to vibrate with an ensuing risk of breakdown.

In order for a filter of this type to function optimally, it is thus necessary to make high demands to the tubing before the inlet of the filter, whereby the optimal velocity profile of the dust-containing flow of air can be ensured.

It is a further drawback of helical inlets that the inlet is to be dimensioned precisely in accordance with the plant in which the filter is to be used, both with regard to the cross sectional area of the inlet and with regard to whether it has to be a clockwise or a counter-clockwise inlet. This means that the filter will not necessarily function optimally if, at a later stage, it is to be used for filtering a flow of air containing another product, or if a larger or smaller amount of air is used than was originally intended. Likewise, there may be problems with the piping if the filter is to be moved to another process plant.

It is the object of the invention to provide a filter of the above-mentioned type whereby it is possible to obtain a considerably higher degree of freedom with regard to the piping before the filter inlet, without an increased wear on the filter bags occurring. Moreover, the filter must be able to be used in changed operating conditions without ensuing problems.

SUMMARY OF THE INVENTION

This is accomplished by configuring the filter described above such that a number of diffuser elements are arranged in the inlet portion outside the filter housing.

By use of diffuser elements in the inlet portion the flow of air from the supply pipe is interrupted and the wearing dust particles in the dust-containing flow of air are slowed down efficiently by collision with the diffuser elements before they enter the dust chamber. By a filter configured in this manner no substantial requirements are made to the piping before the inlet portion unlike the prior art, since the flow of air is being interrupted by the diffuser elements anyway. Thus there is no requirement for a flow of very small turbulence with an even velocity profile before the inlet, and therefore a very high degree of freedom is accomplished with regard to the integration of the filter into a process plant. With regard to wear of the filter bags, it will be minimised, since the dust particles have lost a very large part of their energy in the collision with the diffuser elements. A part of the dust particles, in particular the large ones, will even drop down onto the lower wall of the inlet and from there they will merely be conveyed onwards across the wall face, until they drop down into the dust chamber without influencing the filter bags at all.

According to a preferred embodiment, the inlet portion has a cross sectional area that is increased in a direction towards the filter housing. By configuring the inlet portion in this manner the flow rate of the dust-containing air is reduced in the inlet portion, before it flows into the dust chamber. This also contributes to reducing the wear of the filter bags, since the dust particles that are after all still present in the air on the dust-chamber side of the diffuser elements will hit the filter bags with a smaller speed and hence less force.

Preferably at least a lower wall of the inlet portion has a downward slope in a direction towards the filter housing. Hereby it is accomplished that the dust particles that have been completely braked by the diffuser elements and have dropped down within the inlet portion hit such sloping lower wall and are hence caused to travel onwards into the dust chamber in order to there drop to the bottom of the filter, from where they can be removed along with the remaining filtered-off material. These dust particles are conveyed forwards, on the one hand due to the sloping face, and, on the other, due to the air that flows across the face.

According to a particularly preferred embodiment the inlet portion is configured as a cone with increasing cross section in a direction towards the filter housing. By configuring the inlet portion in this manner, it is possible with a comparatively short inlet portion to achieve a very large reduction of the flow rate of the dust-containing air. Hereby the risk is reduced of dust particles that have already been slowed down being once again carried along by the air, while the likelihood of them dropping again onto the lowermost, sloping wall and onwards into the dust chamber is increased.

Preferably, seen in a direction of the air flow, the diffuser elements block at least an area corresponding to the smallest cross-sectional area of the inlet portion. Hereby it is ensured that no dust particle is able to flow directly into the dust chamber, any dust particle - irrespective of its whereabouts in the air flow -hitting and is slowed down by at least one diffuser element.

According to a preferred embodiment, the diffuser elements comprise a number of lamellae that extend transversally of the flow of air and are arranged offset in relation to each other, laterally as well as axially. Such lamellae constitute a comparatively inexpensive and efficient fractioning of the flow of air.

Preferably the lamellae are configured to be convex against the flow of air. Hereby it is accomplished that the air is conveyed towards the side walls of the inlet portion, whereby a distribution of the flow of air is accomplished that additionally contributes to keeping the side walls free from dust particles.

Preferably the lamellae are carried by thin bars that extend transversally to the lamellae and are secured to the walls of the inlet portion. Such thin bars do not greatly affect the functioning of the lamellae as diffuser elements, and only small amounts of dust will be able to deposit thereon.

The invention will now be explained in further detail with reference to the drawings.

BRIEF DESCRIPTION OF THE DRAWINGS

FIG. 1 is a cross sectional view, seen from the side, of a filter according to a preferred embodiment of the invention;

FIG. 2 is a cross sectional view of the filter shown in FIG. 1, seen along the line II-II; and FIG. 3 shows a part of the filter shown in FIGS. 1 and 2, seen along the line III-III in FIG. 2 (without filter bags).

DETAILED DESCRIPTION OF THE PREFERRED EMBODIMENT

FIGS. 1-3 show various cross sections of a filter 1 according to a preferred embodiment of the invention. FIG. 1 shows the entire filter I in a longitudinal view, from which it will appear that the filter 1 comprises a filter housing 2 that is provided with a horizontal partition wall 3 that divides the filter housing 2 into a clean-air chamber 4 and a dust chamber 5. The partition wall 3 is provided with a number of openings 6, wherein a number of filter bags 7 are arranged.

The filter housing 2 is provided with an inlet portion 8 that is in open communication with the dust chamber 5 in level with the filter bags 7; ie in a level that is above the lowermost end 9 of the filter bags 7. The inlet portion 8 is connected to a supply pipe 10 that is, at the opposite end, in connection with a process unit that discharges dusty air to be filtered in the filter 1.

In use, the dusty flow of air is conveyed via the supply pipe 10 and the inlet portion 18 into the dust chamber 5. From here, the air is sucked through the filter bag 7 into the clean-air chamber 4, from where the filtered air is discharged through a clean-air outlet 11. Some dust particles 12 drop immediately down to the bottom of the dust chamber 5, while others are deposited on the filter bags 7, from where they are removed at a later stage, e.g., by an oppositely directed flushing air being blown through the filter bags or by them being shaken (not shown), whereby they are caused to drop to the bottom of the dust chamber 5. From there they are removed via a dust particle outlet 13.

All of these features are commonly known for filters of the type concerned and will not be described in further detail herein. However, the inlet portion 8 is configured differently than the known inlets for this type of filters, and in the following the characteristic features of the inlet portion 8 are described in further detail.

In FIGS. 1-3 the inlet portion 8 is configured as a cone with increasing cross section seen in a direction towards the filter housing 2. The inlet portion 8 has a smallest cross sectional area A (see FIG. 3) which, in the shown example, corresponds to the cross sectional area of the supply pipe 10. Within the inlet portion 8, a number of diffuser elements are provided in the form of five lamellae 14-16b that extend transversally of the inlet portion 8 and are carried by thin bars 17 that extend transversally of the lamellae 14-16b and are secured to the walls of the inlet portion 8. The five lamellae 14-16b have each their reference numeral, while the thin bars 17 (eg a total of nine as shown) have the same reference number for the sake of simplicity.

The lamellae 14-16b are arranged such in the inlet portion 8 that they delimit at least an area corresponding to the smallest transversal area A of the inlet portion 8. This appears most clearly from FIG. 3 and it is hereby ensured that no dust particles 12 can flow through the lamellae 14-16b and hit the filter bags 7 directly. From FIG. 2 it will appear that the lamellae 14-16b are convex against the flow of air to the effect that they deflect the air outwards towards the walls of the inlet portion 8, whereby it is accomplished, on the one hand, that the air is distributed and, on the other, that the air flows along the wall and prevents dust particles from depositing there.

The lamella 14 is arranged most proximate the supply pipe 10 and its location centrally of the inlet portion 8 causes the air to be forced upwards and downwards and laterally as outlined in FIGS. 1 and 2. The dust particles that are located centrally in the flow of air collide with the lamella 14 and are thereby efficiently slowed down. The air continues past the lamella 14 and reaches lamellae 15a and 15b. There the air is deflected further upwards, downwards and to the sides, and some dust particles collide with lamellae 15a, 15b and are slowed down efficiently. Finally the air hits lamellae 16a and 16b, where the air is further deflected upwards, downwards and to the sides, and further dust particles collide with lamellae 16a, 16b and are slowed down efficiently. When the air reaches the dust chamber 5 the flow is so diffuse that no the filter bags 7 are influenced considerably. Moreover many of the dust particles are slowed down so efficiently by the lamellae 14-16b that they fall down onto the lowermost wall 18 in the inlet portion 8 and are conveyed into the dust chamber 5 along that lowermost wall 18 and immediately drop towards the bottom of the dust chamber 5 without coming into contact with the filter bags 7.

Owing to the conical shape of the inlet portion 8, the flow rate of the air flow is also reduced when it reaches the inlet portion 8. This contributes further to ensuring that the air introduced into the dust chamber 5 will cause very little wear on the filter bags 7.

As mentioned above, by providing the filter housing 2 known per se with an inlet portion 8 provided with diffuser elements (here in the form of lamellae 14-16b), it is accomplished that large requirements are not to be made to the tubing before the inlet portion 8, the air flow still having to be fractioned within the inlet portion 8. A filter 1 configured in this manner can therefore easily be built into a process plant where there is not enough room for an elongate, rectilinear supply pipe as is a requirement of the known filters.

Additionally the filter 1 can readily be used when products are changed or if the supplied amount of air is increased or reduced, since the inlet portion 8 is not dimensioned to match a specific type of product and amount of air to function optimally as is the case with the known helical inlets.

The invention was described with reference to a preferred embodiment as shown in FIGS. 1-3. However, the invention also lends itself for use in connection with other types of filters than the one shown, as long as it is of the type that comprises a number of filter bags in a dust chamber, and the dusty air is supplied in level with the filter bags.

The filter has a circular-cylindrical dust chamber 5, but the invention also lends itself for use in connection with a dust chamber having another configuration, eg rectangular.

The inlet portion 8 is shown with a conical configuration, but it may have any other configuration, such as frustoconical or merely cylindrical without having an increased cross-section in a direction towards the filter housing. Nor does the inlet portion need to be oriented radially towards the filter housing; it may just as well be positioned askew in relation to the filter housing if so desired.

Finally, the diffuser elements shown are lamellae 14-16b, but they may also be configured differently—the only condition being that they slow down the dust particles and prevent them from hitting directly on the filter elements from the supply pipe.

I claim:

1. A filter which comprises:
   a filter housing which includes an essentially horizontal partition wall that divides said housing into a clean air chamber and a dust chamber, said partition wall defining a plurality of apertures; a plurality of filter bags which are connected to the partition wall and extend through respective apertures into the dust chamber; said filter housing defining an outlet channel,
   an inlet portion connected to the filter housing at a location level with lowermost ends of said filter bags for delivering dust-containing air to the dust chamber, from which clean air can be sucked through the plurality of filter bags into the air chamber and removed through the outlet channel, with dust accumulated in the dust chamber, said inlet means defining a first cross-sectional area at an inlet mouth thereof and a second, larger cross-sectional area between the inlet mouth and the filter housing, and
   a plurality of separate diffuser elements within the inlet portion for interrupting flow of dust-containing air approaching the filter housing slowing of dust particles by impact with the diffuser elements before entering the dust chamber.

2. The filter according to claim 1, wherein the inlet portion has a cross-sectional area that increases in a direction towards the filter housing.

3. The filter according to claim 2, wherein at least a lowermost wall of the inlet portion slopes downwardly in a direction towards the filter housing.

4. The filter according to claim 3, wherein the inlet portion is configured as a cone with increasing cross section from the inlet mouth to the filter housing.

5. The filter according to claim 1, wherein the diffuser elements, seen in a direction of the air flow, block at least an area corresponding to a smallest cross-sectional area of the inlet portion.

6. The filter according to claim 1, wherein the diffuser elements comprise a number of lamellae that extend transversally of the flow of air and are arranged offset in relation to each other, both laterally and in the direction of the flow of air.

7. The filter according to claim 6, wherein the lamellae are configured convex against the flow of air.

8. The filter according to claim 6, wherein the lamellae are carried by thin bars that extend transversally to the lamellae and are secured to walls of the inlet portion.

* * * * *